United States Patent

[11] 3,563,330

| [72] | Inventor | Gunter Strauff<br>Kaarst, Germany |
|---|---|---|
| [21] | Appl. No. | 821,268 |
| [22] | Filed | May 2, 1969 |
| [45] | Patented | Feb. 16, 1971 |
| [73] | Assignee | Langen & Co.<br>Dusseldorf, Germany |
| [32] | Priority | May 3, 1968 |
| [33] | | Germany |
| [31] | | P 17 55 390.1 |

[54] HYDRAULIC CIRCUIT FOR MOTOR VEHICLES
3 Claims, 4 Drawing Figs.

[52] U.S. Cl. .................................................. 180/79.2, 280/124
[51] Int. Cl. ................................................... B62d 5/06
[50] Field of Search .......................................... 180/79.2; 280/124, 124(F), (L R Digest)

[56] References Cited
UNITED STATES PATENTS

| 2,895,744 | 7/1959 | Jackson ....................... | 180/79.2X |
| 3,043,607 | 7/1962 | Ruffle et al. ................... | 280/124(F) |

Primary Examiner—Benjamin Hersh
Assistant Examiner—John A. Pekar
Attorney—Holman and Stern ABSTRACT: A hydraulic circuit for motor vehicles in which a single pumping means is used for supplying a servo-steering system including an open center valve as well as a level-regulating device.

PATENTED FEB 16 1971
3,563,330
SHEET 1 OF 3
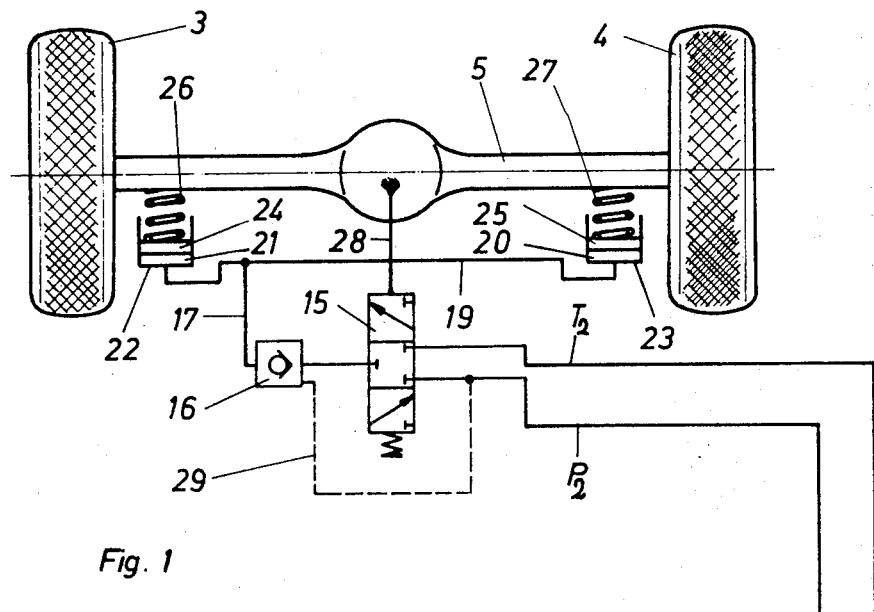
Fig. 1
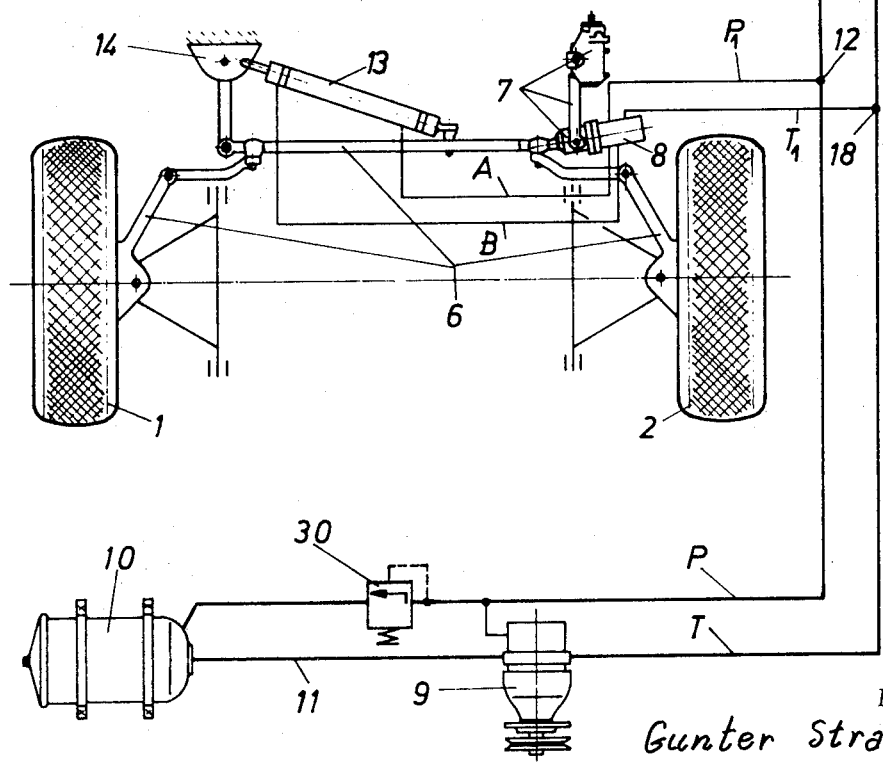
INVENTOR
Gunter Strauff
BY
Holman, Glascock, Downing & Seebold
ATTORNEYS

HYDRAULIC CIRCUIT FOR MOTOR VEHICLES

BACKGROUND OF THE INVENTION

This invention relates to a hydraulic circuit for motor vehicles.

It is known for reasons of savings in cost and simplification, to feed several consuming units in a motor vehicle from a pump but in these situations the individual consuming units are arranged in series. For example, a driving device for a fan and/or dynamo as well as the servo-steering mechanism are known in German printed application DAS 1,093,684 in which the steering gear assemblage is located behind the fan and/or dynamo drive provided with fly wheel masses. These series connections can always be employed properly when one of the consuming units is constantly traversed by fluid and when, in addition, a power drop during the addition of the second consuming unit is acceptable. In a hydraulic circuit of the above discussed type, a series connection is not feasible. Since the operating safety of the steering system takes precedence, the steering gear assemblage would have to be arranged in front of the level-regulating device since the regulating device blocks the flow, dependent upon its position. This means that the pressure in the steering gear assemblage would be increased by the generally substantially higher pressure in the level-regulating device and that the steering valve and steering cylinder would have to be of larger dimensions. Moreover, packing problems would arise, the consumption of energy would be higher and possibly the installation of a cooling system would be necessary. The advantage of the open center type namely, the substantially pressure free circulation of the fluid in the center position of the steering valve would be lost.

SUMMARY OF THE INVENTION

The salient object of the present invention is to avoid the above discussed disadvantages and to provide a hydraulic circuit of the type under consideration so that a well functioning steering gear assemblage with a pressure free circulation in the center position of the steering valve is realized without any substantially increased space requirements and expensive additional components while the load compensating level regulation would still be maintained.

The problem is solved in that the pressure line for the supply of the level-regulating device of the pressure line is connected in parallelism to the servo-steering gear assemblage and an unlockable check valve, opening in the direction of the adjusting cylinder is positioned between the level-regulating valve and the adjusting cylinder whose control line is connected at least in the down regulating position to the level-regulating valve with the pressure line and whose unlocking piston is so dimensioned that there is no unlocking when the pressure in the pressure line is lower than the pressure in the adjusting cylinder.

In the solution of the problem, the fact that load variations in motor vehicles are substantially always effected during a standstill was the starting consideration and that motor vehicles, particularly passenger vehicles drive on an average of not more than a few hours without making at least one stop. Hence, it can be deemed sufficient for normal purposes if a standing or stationary vehicle can be brought immediately into its level position after a load change by a simple measure and remain in such position for an extended period of time. This measure resides in that the steering wheel is greatly turned in, if necessary sufficiently far until the servopiston of the steering cylinder strikes against a stop or abutment. The resultant pressure is substantially higher than the "normal" pressure in the pressure line necessary for steering during driving of the vehicle and is sufficient for level-regulation purposes.

The level-regulating procedure is completed in a short period of time if sufficient flow cross sections are available in the level-regulating valve and if level-regulating valves having a great throttling effect are employed, which are to prevent a reaction of the level-regulating device in dynamic level changes, it may be advisable to install a hydroaccumulator as well as a check valve in the pressure line in front of the level-regulating valve. In this way, it is possible to fill the hydroaccumulator in a relatively short time which accumulator then provides over a longer period, the amount of pressure medium required for level-regulation.

Additional objects and advantages of the invention will become more readily apparent to persons skilled in the art from the following detailed description and annexed drawings and in which drawings:

BRIEF DESCRIPTION OF THE DRAWINGS

FIG. 1 is a diagrammatic view of a hydraulic circuit for a motor vehicle embodying the present invention;

DETAILED DESCRIPTION OF THE INVENTION

Figure 3:
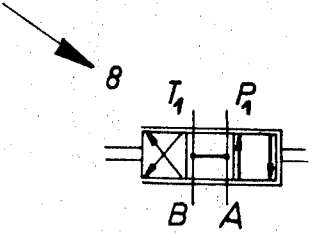
FIG. 3 is a diagrammatic view of the steering valve.

Referring to FIG. 1 it will be noted that numeral 14 denotes generally the chassis of a motor vehicle having front wheels 1 and 2 separately suspended and rear wheels 3 and 4 mounted on an axle 5. The steering of the front wheels 1 and 2 is effected by means of a linkage 6 actuated by means of a steering gear assembly 7 which assemblage is only partially illustrated. A steering valve 8 is operably connected with the steering gear assemblage 7 and the flow paths within the valve 8 are illustrated in detail in FIG. 3.

The hydraulic circuit of the motor vehicle is fed by a pump 9 which draws in fluid from a tank 10 via a suction line or conduit 11 and forces the fluid into a pressure line P. The pressure line P branches at point 12 into pressure lines P1 and P2. The pressure line P1 communicates with the steering valve 8 and in the central position of the valve 8 the fluid flows substantially pressure free from the line P1 into a tank line T1 and therefrom into a tank line T which returns to the pump 9. Dependent upon the actuation of the steering valve 8, the fluid flows from the pressure line P1 into one of working lines or conduits A or B operably connected to pressure spaces of the steering cylinder arrangement 13. The cylinder arrangement 13 is secured to the chassis 14 and linkage 6 and is so admitted over the steering valve that it enhances the action of the steering gear 7. From the branch point 12, the pressure line P2 communicates with a level-regulating valve 15 which connects, on the one hand, a line or conduit 17 via a series connected unlockable check valve 16 with the pressure line P2, and on the other hand, with a tank line T2 which joins the tank lines T and T1 at branch point 18.

The line 17 communicates with a line 19 which connects working spaces 20 and 21 of adjusting cylinders 22 and 23 respectively. The adjusting cylinders 22 and 23 are secured to the chassis 14 and serve to guide pistons 24 and 25 respectively. Springs 26 and 27 are biased between the axle 5 and the pistons 24 and 25 respectively. The distance between the axle 5 and the and the chassis 14 is transmitted to the level-regulating valve 15 by a linkage means 28 which engages the axle 5 at approximately the center thereof. A control line 29 for unlocking the check valve 16 is always connected with the pressure line P2 and a pressure limiting valve 30 is provided for the pressure line P.

Figure 2:
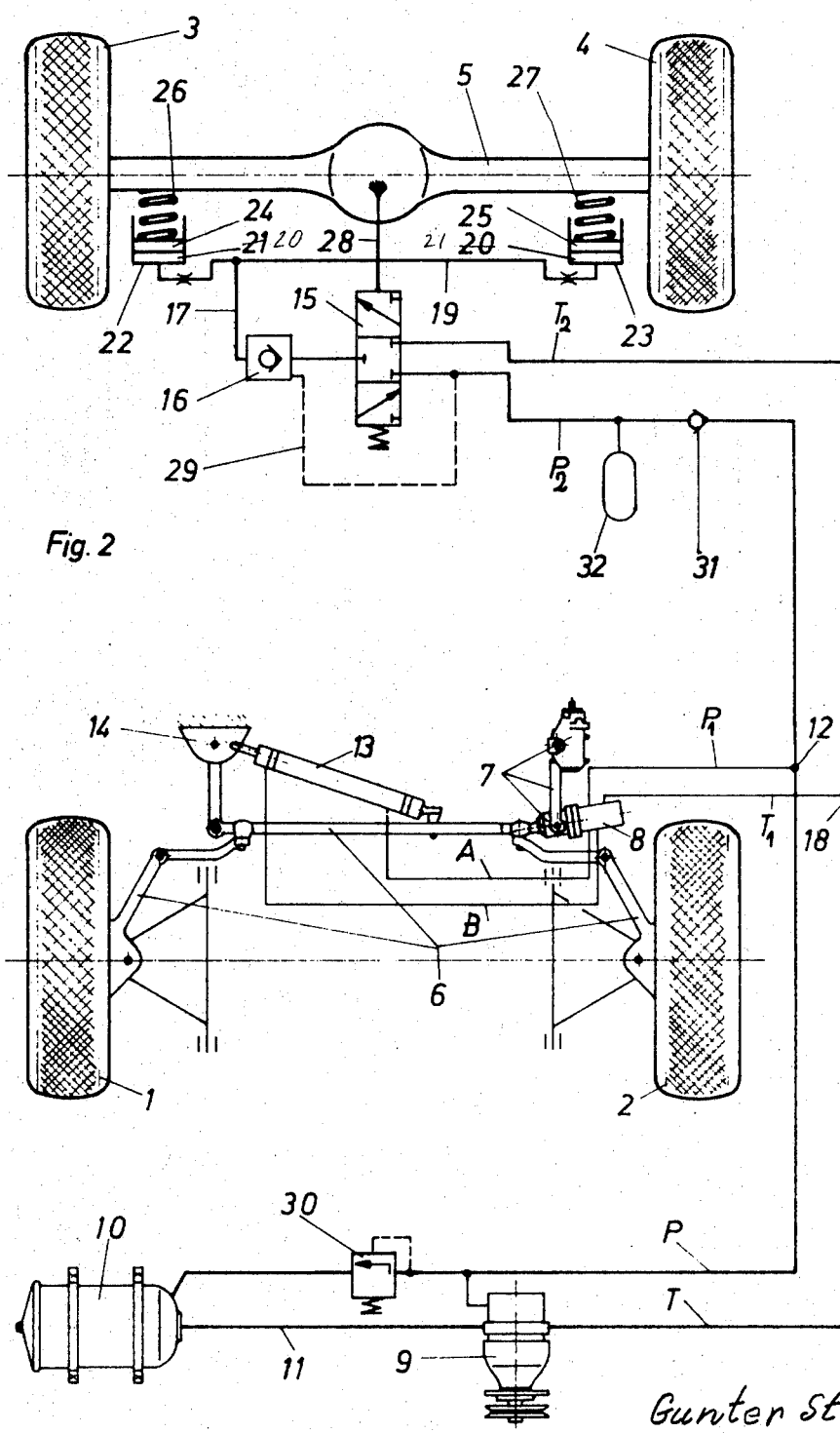
FIG. 2 is a diagrammatic view generally similar to FIG. 1 in which there is provided a hydroaccumulator and a check valve.

Referring to the embodiment illustrated in FIG. 2, it will be noted that the pressure line P2 includes a check valve 31 which opens in the direction of the level-regulating valve 15. Moreover, a hydroaccumulator 32 is connected to the pressure line P2 between the check valve 31 and the level-regulating valve 15.

Figure 4:
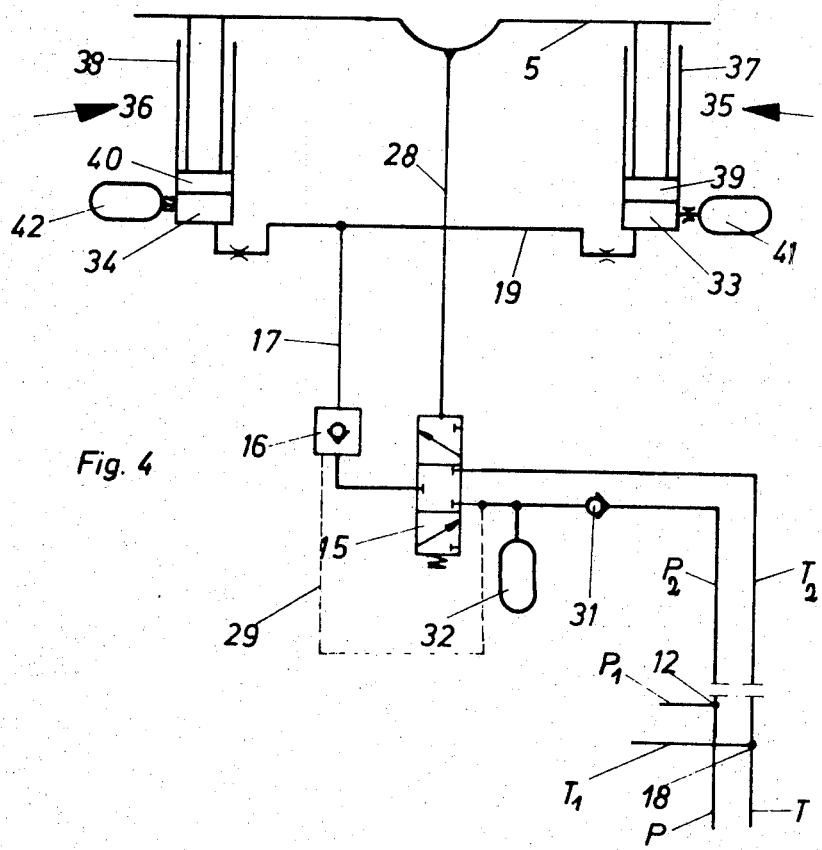
FIG. 4 is a fragmentary diagrammatic view of a circuit provided with hydropneumatic telescopic springs.

In FIG. 4, it will be observed that the line 19 opens into pressure spaces 33 and 34 of hydropneumatic telescopic springs 35 and 36. The components 35 and 36 essentially include cylinders 37 and 38, pistons 39 and 40 moveable therein and hydroaccumulators 41 and 42 connected to the pressure spaces 33 and 34. The cylinders 37 and 38 are secured to the chassis and the pistons 39 and 40 to the axle 5.

While the operation of the hydraulic circuit illustrated in FIG. 1 is believed clear, it may be summarized as follows:

Assuming the vehicle to be loaded and the engine and the pump 9 stationary, the springs thus retract and since level-regulation does not yet occur, the distance between the axle 5 and the chassis 14 diminishes or shortens. Upon starting of the engine, the pump 9 starts to function and if the steering valve 8 is in its center position, a substantially pressure free circulation is obtained. The low pressure head produced in the pressure lines P, P1, P2 is not sufficient with the usual dimensions of the adjusting cylinders 22 and 23 to open the check valve 16 against the pressure existing in the components 20, 21, 19, 17. In order to insure that the check valve is only opened when the pressure in the line P2 is higher than the pressure in the line 17, the effective surface of the unlocking piston is smaller than the effective surface of the check valve.

If a steering operation is now initiated, the pressure free circulation is interrupted and the steering cylinder 13 is admitted. The steering resistance results in a rise in pressure which obtains a maximum value adjustable on the pressure limiting valve 30 when the wheels 1 and 2 are turned so far inwardly that the steering cylinder 13 strikes a stop. This maximum pressure is so selected that it suffices at any admissable load to open the check valve 16. The fluid then flows via the level-regulating valve 15 and the lines 17 and 19 into the working spaces 20 and 21 thereby extending the pistons 24 and 25 so that the distance between the axle 5 and the chassis 14 again increases. The increased distance is transmitted by the linkage means 28 to the level-regulating valve 15, and the adjusting procedure is terminated when the valve 15 has again attained its center position. The wheels 1 and 2 can again be brought into a straight position.

The resulting pressure drop in the pressure lines P, P1, P2 effects the closing of the check valve 16 and hence a substantially hermetic seal of the components 17, 19, 20, 21. By virtue of modern packing techniques, it is possible to pack the cylinders 24 and 25 so that the vehicle will not lose height after a period of several hours.

During a normal steering operation, the full delivery of the pump 9 is available for steering purposes and since the maximum pressure in the steering system appears but briefly and has merely a static effect no packing problems arise.

Referring to the circuit illustrated in FIG. 2 and with a complete steering lock, the hydroaccumulator 32 is initially charged. During the subsequent standstill or even in the course a normal ride, the pressure medium will flow from the hydroaccumulator via the level-regulating valve 15 and the check valve 16 into the working spaces 20 and 21. A return flow of the pressure medium from the hydroaccumulator 32 to the pump 9 or via the steering valve 8 to the tank 10 is prevented by the check valve 31.

The invention is not to be restricted to the embodiments illustrated. More particularly, the number of wheels or axles provided with a level-regulating unit is arbitrary as is the type of spring suspension so long as the spring suspension bears against an adjusting cylinder or an adjusting cylinder is interposed between the axle or wheel and the spring suspension. For example, leaf springs can be supported by adjusting cylinders against the chassis or torsion bars can be turned by means of a lever via an adjusting cylinder.

I claim:

1. A hydraulic circuit for vehicles of the type provided with a chassis, at least one axle having ground wheels, a servo-steering system including an open center valve and a level-regulating device in which a single pump is employed for supplying pressure fluid to the system and unit, the improvement comprising a pressure line for said valve, a pressure line for the level-regulating device connected parallel to the pressure line for said valve, said level-regulating unit including a level-regulating valve operably connected to the axle and at least one adjusting cylinder piston unit located between the chassis and the axle, an unlockable check valve arranged in a line between the level-regulating valve and the adjusting cylinder piston unit, said check valve opening in the direction of the adjusting cylinder piston unit, a control line for the unlockable check valve connected, at least in the down regulating position of the level-regulating valve, with the pressure line for the level-regulating device, and an unlocking piston therefor being so dimensioned that if the pressure in the pressure line for the level-regulating device is lower than the pressure in the adjusting cylinder piston unit, there is no unlocking of the check valve.

2. The hydraulic circuit for vehicles as claimed in claim 1 including a check valve opening in the direction of the level-regulating valve and a hydroaccumulator in said pressure line for the level-regulating device downstream of the connection between said pressure lines.

3. The hydraulic circuit for vehicles as claimed in claim 1 in which said level regulating valve and check valve are a unitary assemblage.

UNITED STATES PATENT OFFICE
CERTIFICATE OF CORRECTION

Patent No. 3,563,330          Dated February 16, 1971

Inventor(s)   Günther STRAUFF

It is certified that error appears in the above-identified patent and that said Letters Patent are hereby corrected as shown below:

Correct the spelling of the first name of the inventor to read: -- Günther --.

Signed and sealed this 3rd day of July 1973.

(SEAL)
Attest:

EDWARD M. FLETCHER, JR.　　　　　Rene Tegtmeyer
Attesting Officer　　　　　　　　Acting Commissioner of Patent